United States Patent
Dow

(10) Patent No.: US 10,458,156 B2
(45) Date of Patent: Oct. 29, 2019

(54) RETURN MECHANISM FOR DOUBLE PULL DOOR LATCH

(71) Applicant: Inteva Products, LLC, Troy, MI (US)

(72) Inventor: Ian Dow, Bloomfield, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 678 days.

(21) Appl. No.: 15/071,672

(22) Filed: Mar. 16, 2016

(65) Prior Publication Data
US 2017/0268263 A1   Sep. 21, 2017

(51) Int. Cl.
*E05B 79/08*   (2014.01)
*E05B 77/22*   (2014.01)
*F16H 37/12*   (2006.01)

(52) U.S. Cl.
CPC .............. *E05B 79/08* (2013.01); *E05B 77/22* (2013.01); *F16H 37/12* (2013.01); *Y10T 292/57* (2015.04); *Y10T 292/82* (2015.04)

(58) Field of Classification Search
CPC ........................... Y10T 292/57; Y10T 292/82
USPC ....................................................... 292/336.3
See application file for complete search history.

(56) References Cited

U.S. PATENT DOCUMENTS

| 3,993,338 | A  | * | 11/1976 | Cherbourg ............... B60J 5/06 292/336.3 |
| 6,264,257 | B1 | * | 7/2001  | Meinke ................... E05B 85/10 292/336.3 |
| 6,367,296 | B1 | * | 4/2002  | Dupont .................. E05B 81/16 292/201 |
| 8,474,888 | B2 | * | 7/2013  | Tomaszewski ......... E05B 77/26 292/201 |
| 8,573,657 | B2 | * | 11/2013 | Papanikolaou ......... E05B 81/14 292/201 |
| 2005/0206174 | A1 | * | 9/2005  | Fisher .................... E05B 83/36 292/226 |
| 2015/0354255 | A1 | * | 12/2015 | Wittelsbuerger ....... F16C 1/145 292/336.3 |

FOREIGN PATENT DOCUMENTS

GB          2300667 A   *  11/1996  ........... E05B 13/005

* cited by examiner

*Primary Examiner* — Carlos Lugo
(74) *Attorney, Agent, or Firm* — Cantor Colburn LLP

(57) ABSTRACT

A mechanism for a double-pull type door latch is described. A return mechanism is described that includes a final lever coupled to rotate about a pivot. A position wheel is rotationally coupled to the pivot, the position wheel having a first notch and a second notch, the position wheel being rotatable in a first direction. A cam member is coupled to the position wheel, the cam member having a cam surface. A drive lever is arranged to engage the first notch and the second notch. A biasing member is arranged to apply a force on the cam surface to move the position wheel in the first direction when the drive lever is moved into the second notch.

14 Claims, 9 Drawing Sheets

RETURN MECHANISM FOR DOUBLE PULL DOOR LATCH

BACKGROUND OF THE DISCLOSURE

The subject matter disclosed herein relates to door latch for a vehicle, and in particular to a reset mechanism for a double-pull type door latch.

Vehicle doors typically have latches to prevent the door from being inadvertently opened during operation. The latches include an outside handle that allows the user to disengage the lock to open the door and enter the vehicle. Similarly, an inside handle is provided that allows a vehicle occupant to disengage the lock to open the door and exit the vehicle. Traditionally, the door latches were of a single pull configuration. In a single pull configuration, the occupant only had to move the inside handle once to disengage the latch and open the door.

To prevent occupants from inadvertently opening the door during operation, a double-pull latch was used. In a double-pull latch, the occupant needs to move the inside handle twice before the latch was disengaged. In this way, if the occupant inadvertently pulled the inside handle during operation, the door would not open without the occupant performing a second action. With these double-pull type latches, the latch would transition from a latched state to an active state when the handle was pulled the first time. Unfortunately, the latch would remain in the active state until the door was opened.

Accordingly, while existing double-pull latches are suitable for their intended purpose, the need for improvement remains, particularly in providing a latch that returns the latch to the non-activated state when the handle is not pulled within a predetermined amount of time.

BRIEF DESCRIPTION OF THE DISCLOSURE

According to one aspect of the disclosure a return mechanism for a latch is provided. The return mechanism includes a final lever coupled to rotate about a pivot. A position wheel is rotationally coupled to the pivot, the position wheel having a first notch and a second notch, the position wheel being rotatable in a first direction. A cam member is coupled to the position wheel, the cam member having a cam surface. A drive lever is arranged to engage the first notch and the second notch. A biasing member is arranged to apply a force on the cam surface to move the position wheel in the first direction when the drive lever is moved into the second notch.

According to another aspect of the disclosure a method of resetting a double pull latch is provided. The method includes rotating a position wheel in a first direction from a first position to a second position based on a door handle being pulled a first time. The position wheel is rotated in the first direction from the second position to the first position when the door handle is not pulled a second time within a predetermined period of time. A final lever is rotated with the position wheel to a third position when the door handle is pulled a second time within a predetermined period of time.

According to yet another aspect of the disclosure a double-pull door latch is provided. The latch includes a door handle and a release lever coupled to the door handle, the release lever rotating about a pivot. A position wheel is operably coupled to the release lever to rotate about the pivot, the position wheel having a first notch and a second notch. The release lever and position wheel cooperate to rotate the position wheel in a first direction from a first position to a second position based on the door handle being pulled a first time. The release lever and the position wheel further cooperate to rotate the position wheel to a released position based on the door handle being pulled a second time within a predetermined time period. The latch further includes a cam member coupled to the position wheel and a biasing member. The biasing member cooperates with the cam member to rotate the position wheel in the first direction from the second position to the first position based on the door handle not being pulled a second time within the predetermined time period.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Advantages of disclosed embodiments include providing a return mechanism for a double-pull type of latch where the latch is returned to a home or first position if the operator does not pull the latch handle a second time within a predetermined time period.

Figure 1:
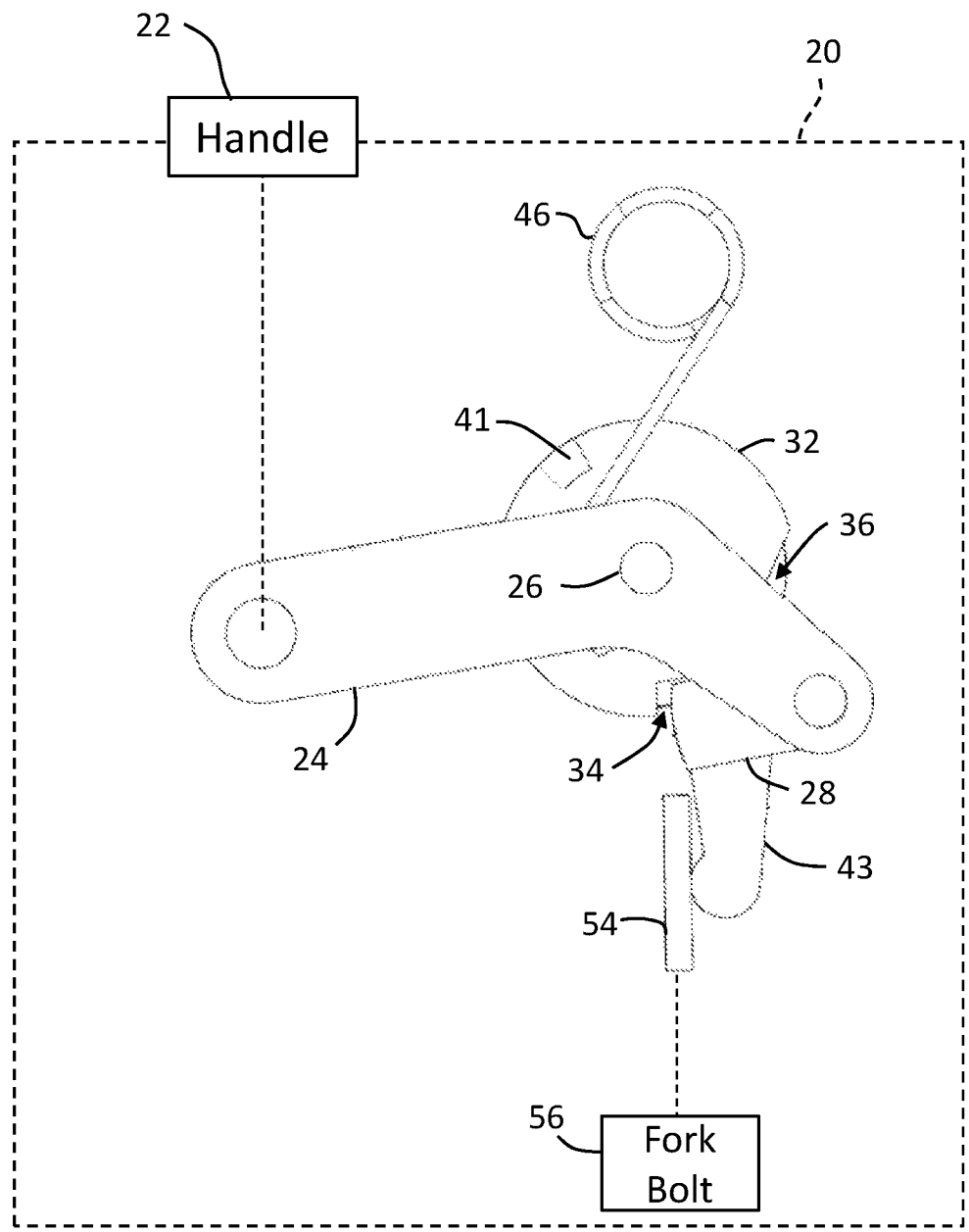
FIG. 1 is a first side view of a return mechanism for a double-pull type latch in a first position.
Figure 2:
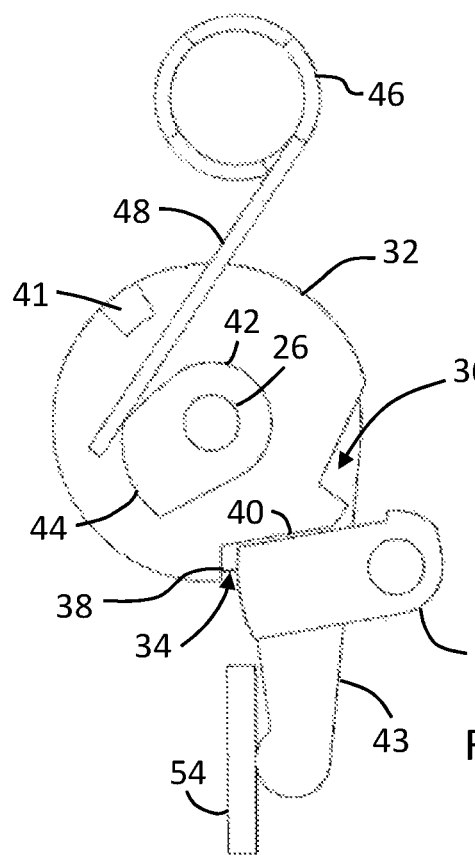
FIG. 2 is a first side view of the return mechanism of FIG. 1 with the release lever removed.
Figure 3:
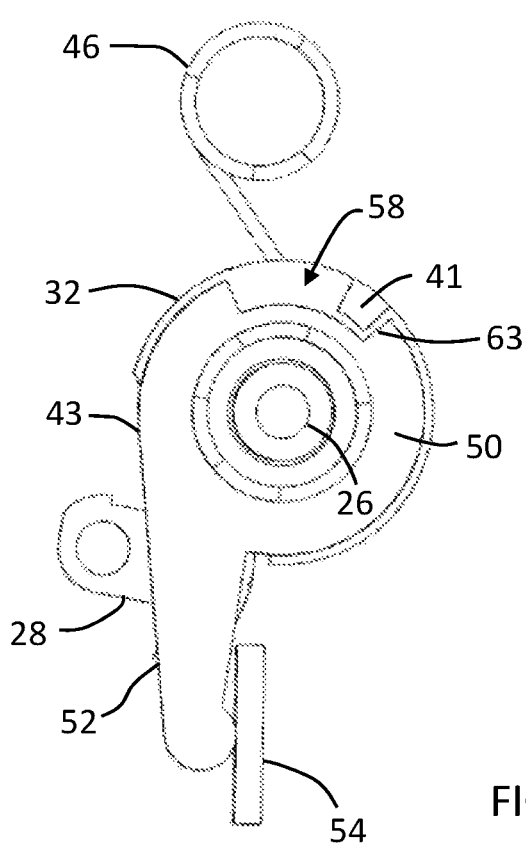
FIG. 3 is a second side view of the return mechanism of FIG. 1 with the release lever removed.

Referring now to FIGS. 1-3 a latch 20 for a vehicle door is shown in a non-activated or first position. The latch 20 includes a handle 22 that allows the occupant to disengage the latch 20 to open the vehicle door and exit the vehicle. The handle 22 is coupled to a release lever 24. The release lever has an "L" or dog-bone shape and rotates about a pivot 26. On an opposite side of the release lever 24 from the handle 22 connection is a drive lever 28 that is rotationally coupled to the release lever 24. It should be appreciated that the pivot 26 may be a suitable member, such as a pin, that provides a common axis of rotation for components coupled to it.

A position wheel 32 is coupled to rotate about the pivot 26. The position wheel 32 has a generally a thin cylindrical shape with a first notch 34 and a second notch 36 formed radially adjacent to each other on an outer diameter. In one non-limiting embodiment, each notch 32, 34 includes a first surface 38 that extends radially from the outer diameter towards the center of the pivot 26. A second surface 40 extends from the first surface 38 to the outer diameter. As will be discussed in more detail herein, the surfaces 38, 40 cooperate with the drive lever 28 to rotate the position wheel 32. In one non-limiting embodiment, the position wheel 32 may include a key member 41 that engages a final lever 43 when the user pulls the handle 22 two times within a predetermined period of time.

Axially disposed between the position wheel 32 and the release lever 24 is a cam member 42. The cam member 42 is coupled to the position wheel 32 and rotates about the pivot 26. The cam member 42 includes a cam surface 44. In one non-limiting embodiment, the cam surface 44 is an arcuate surface. As will be discussed in more detail herein, the arcuate surface of cam surface 44 may be configured to rotate the position wheel 32 in a counterclockwise direction (when viewed from the position of FIG. 2) when a user pulling the lever 22 once and based on a force from the drive lever 28. When the position wheel is in the first position shown in FIG. 2, the biasing member 46 and the cam surface 44 cooperate to rotate the position wheel 32 in the counterclockwise direction (when viewed from the position of FIG. 2) such that the surface 38 may contact the drive lever 28. In one non-limiting embodiment, the biasing member 46 is a torsion spring having an arm 48 that applies a force on the cam surface 44.

As shown in FIG. 3, the final lever 43 is coupled to rotate about the pivot 26. The final lever 43 is positioned adjacent the position wheel 32 opposite the cam member 42. In one non-limiting embodiment, the final lever 43 includes a generally cylindrical body portion 50 and an arm 52. The arm 52 is sized and shaped to engage a pawl 54. The pawl 54 is operably coupled to a fork bolt 56 (FIG. 1) that releasably secures the door of the vehicle. In one non-limiting embodiment, the cylindrical body portion 50 includes a radial slot 58 formed along an outer diameter of the cylindrical body portion 50. The slot 58 is sized to receive the key member 41 and allow the key member 41 to move along the slot 58 in response to the user pulling the handle 22.

Figure 4:
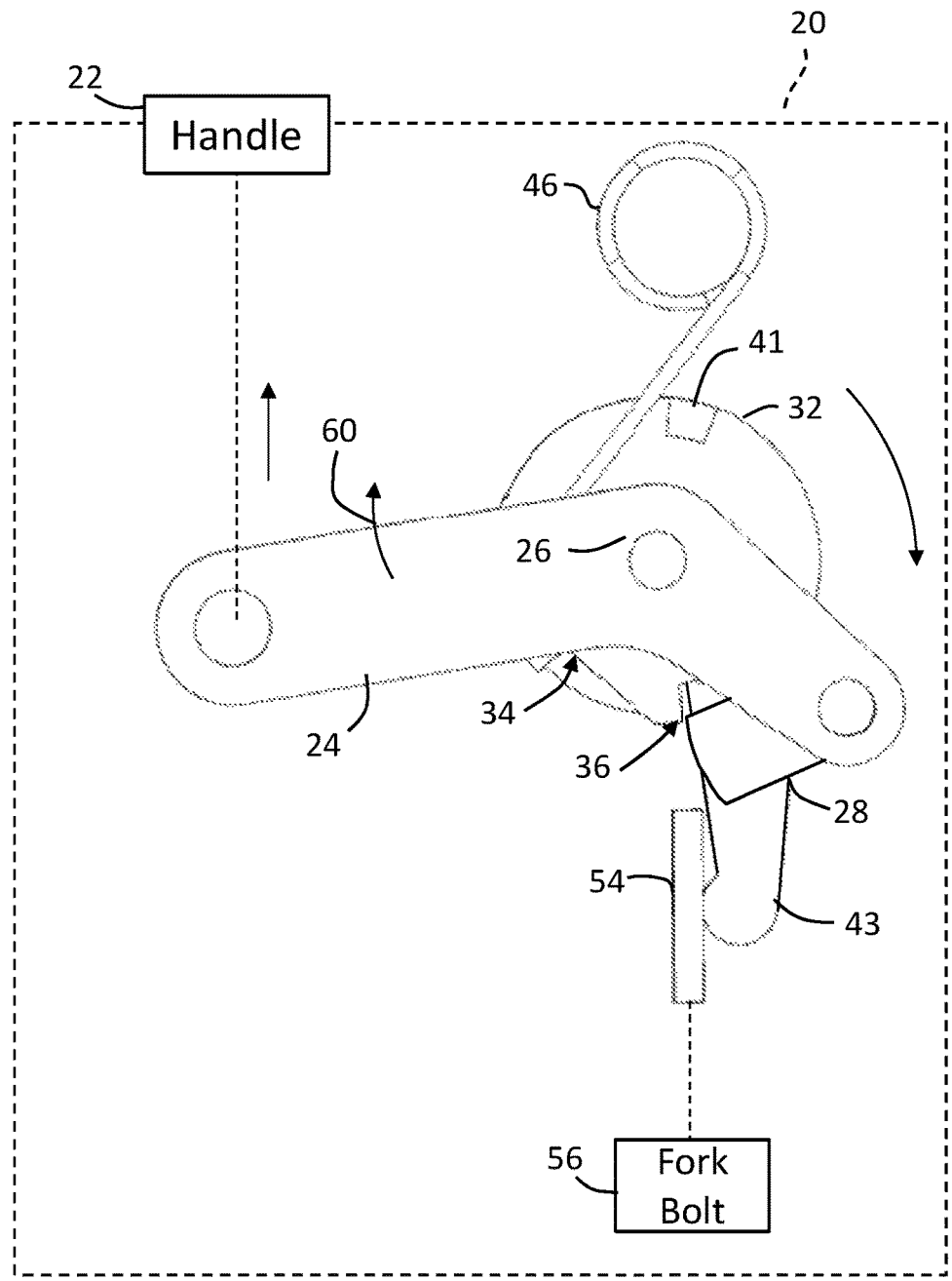
FIG. 4 is a first side view of the return mechanism of FIG. 1 in a second position.
Figure 5:
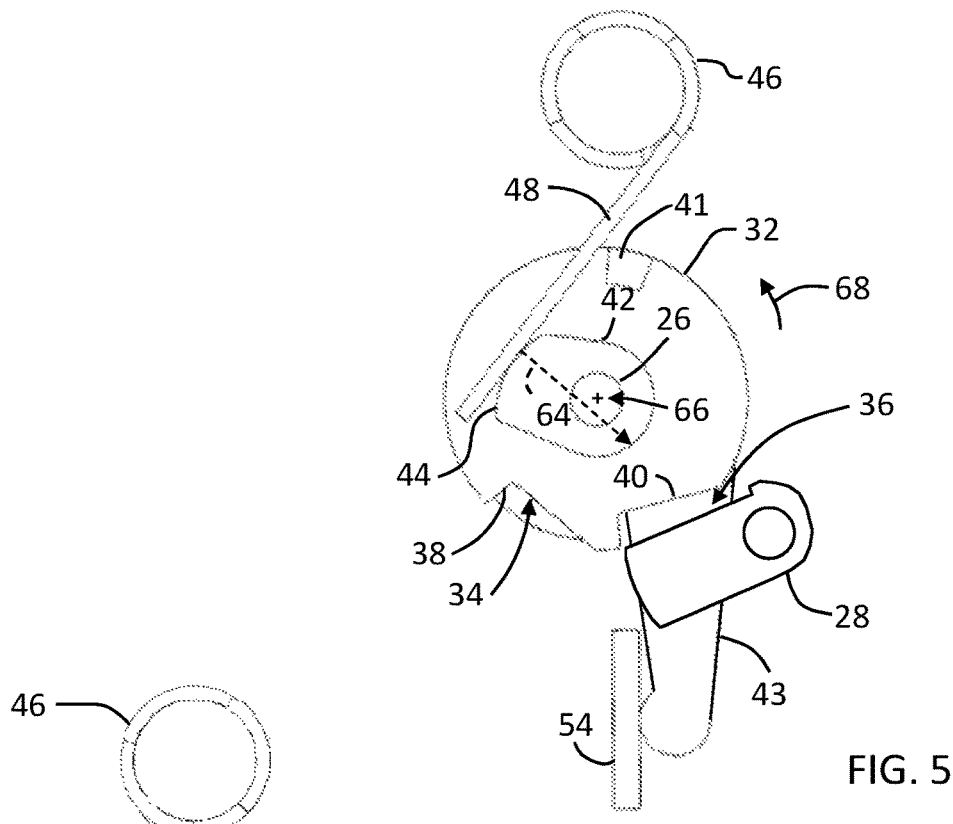
FIG. 5 is a first side view of the return mechanism of FIG. 4 with the release lever removed.
Figure 6:
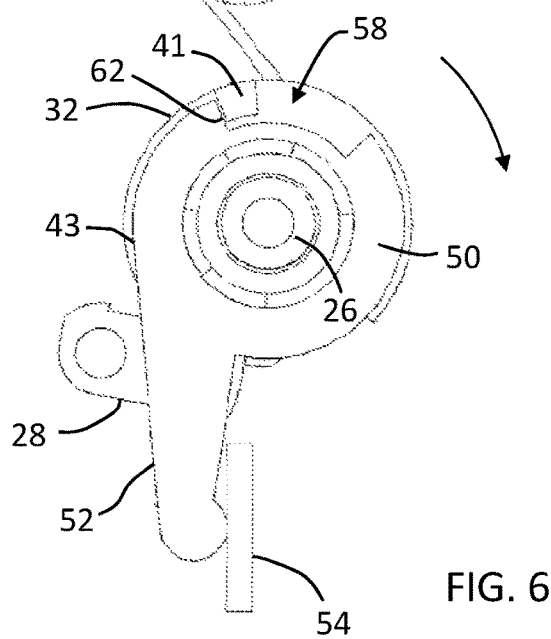
FIG. 6 is a second side view of the return mechanism of FIG. 4 with the release lever removed.
Figure 10:
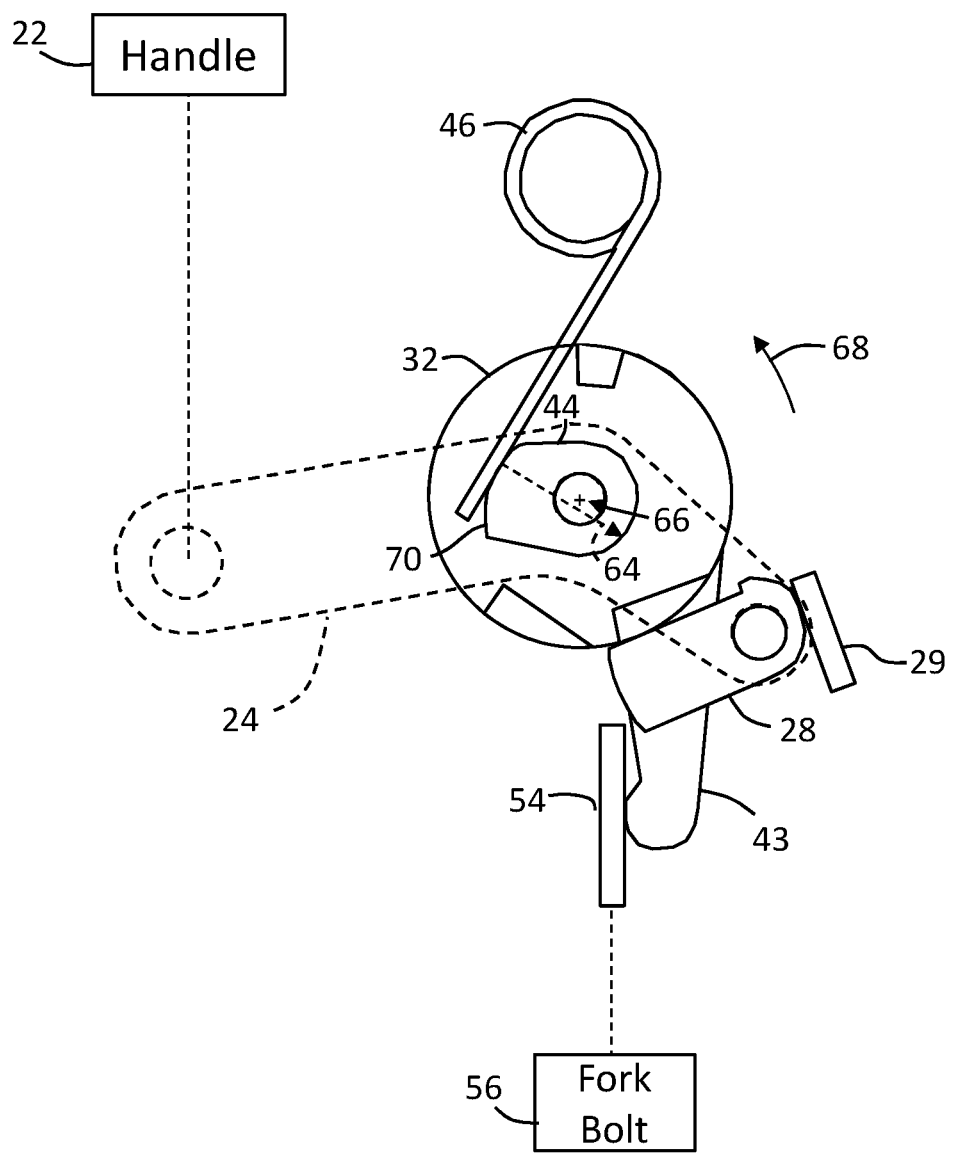
FIG. 10 and FIG. 11 are first side views of the return mechanism of FIG. 1 with the position wheel transitioning back to the first position.
Figure 11:
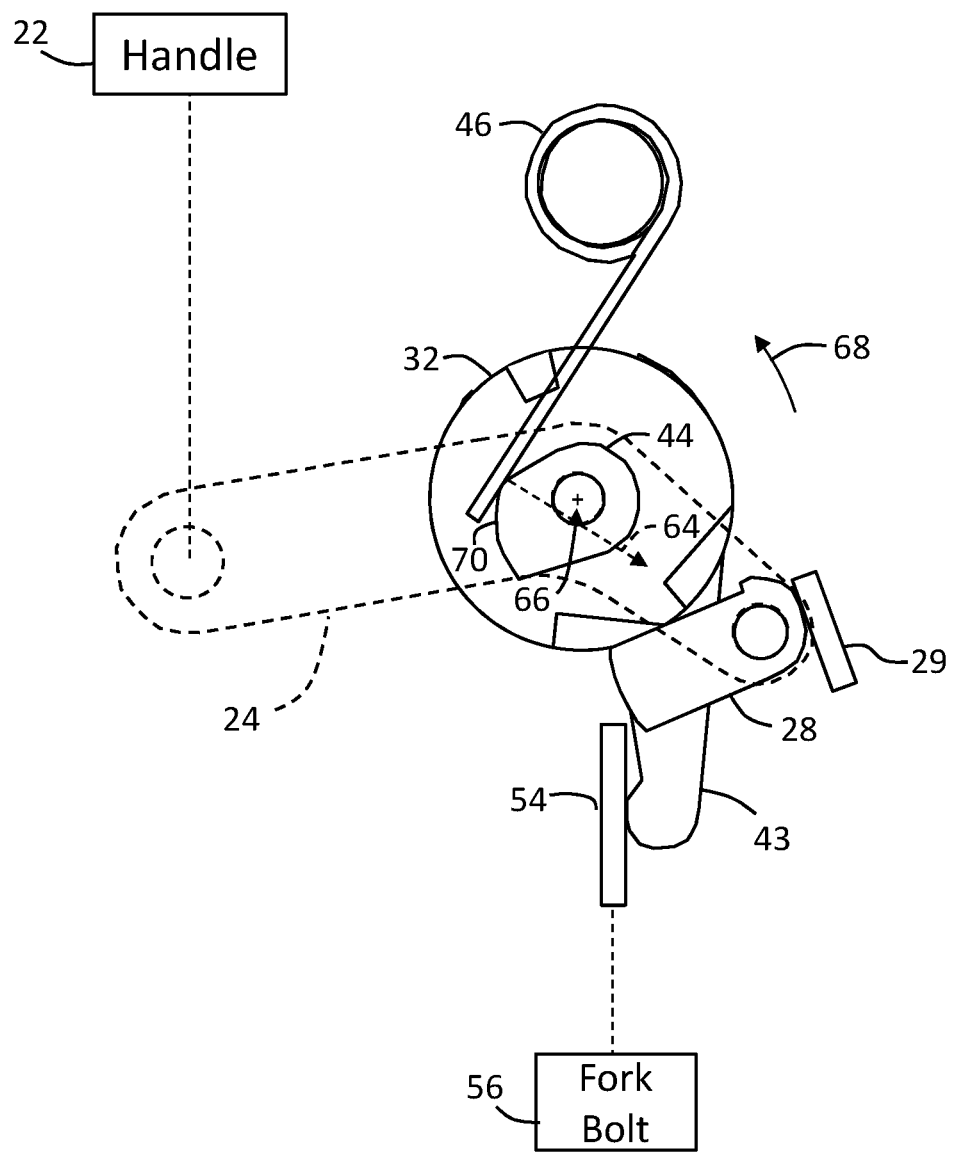
Figure 12:
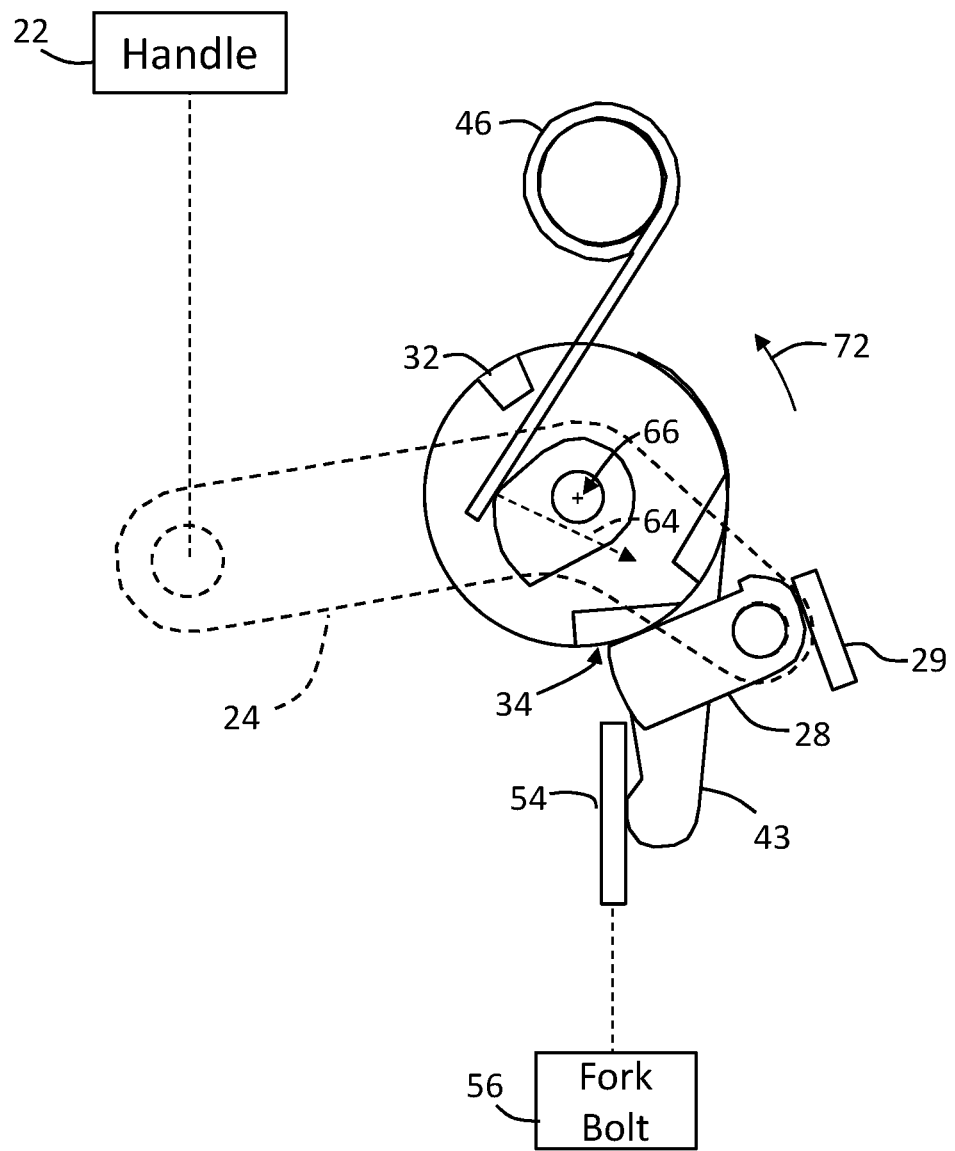
FIG. 12 is a first side view of the return mechanism of FIG. 10 and FIG. 11 with the position wheel in the first position.

Referring now to FIGS. 4-6, the operation of the latch 20 is shown based on the user or vehicle occupant pulling the handle 22 a first time. When the handle 22 is pulled, the release lever 24 rotates in the direction indicated by arrow 60 about pivot 26. The rotation of the release lever 24 causes the end of the drive lever 28 to contact the surface 38 and rotate the position wheel 32 to the second position. When the handle 22 is released, the release lever 24 rotates back to its original position due to a biasing member (not shown) such as a spring. As the release lever 24 rotates back, the drive lever 28 rotates away from the surface 40 of the first notch 34 and is positioned adjacent the second notch 36. In an embodiment, the open position of the drive lever 28 may be defined by a stop member 29 (FIG. 10-12). When in the second position, the latch 20 is in an activated state and is positioned to unlatch the vehicle door in response to a second pull of the handle 22. It should be appreciated that in the second position, the key member 41 moves within the slot 58 to be adjacent a side wall 62 (FIG. 6).

Figure 7:
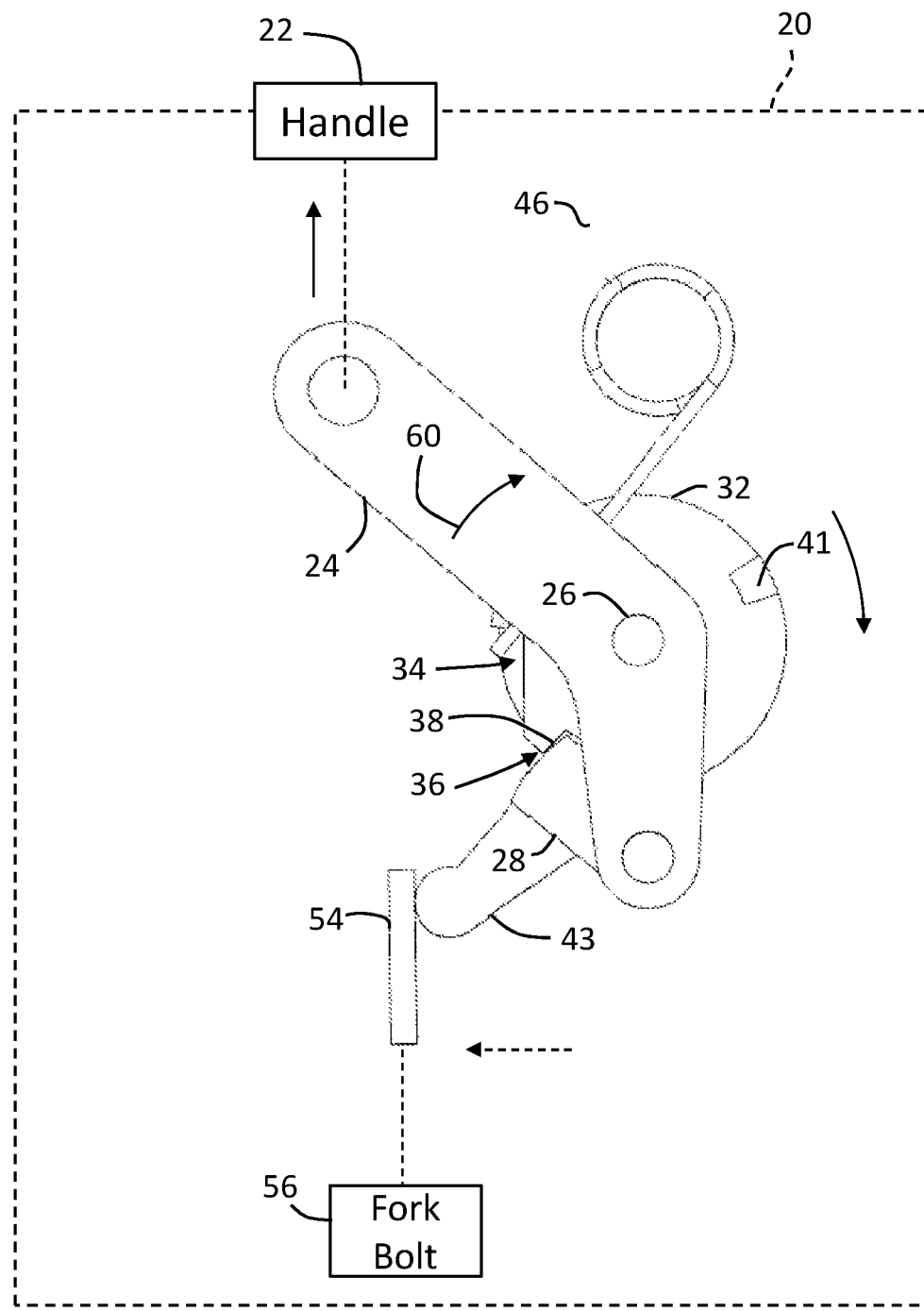
FIG. 7 is a first side view of the return mechanism of FIG. 1 in a third or released position.
Figure 8:
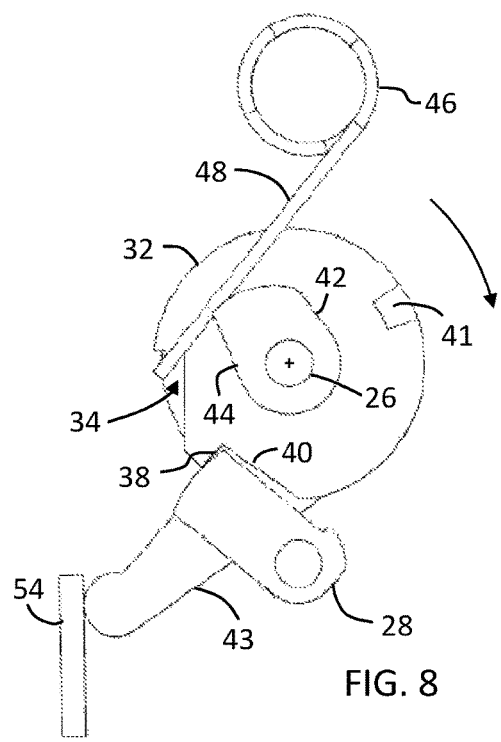
FIG. 8 is a first side view of the return mechanism of FIG. 7 with the release lever removed.
Figure 9:
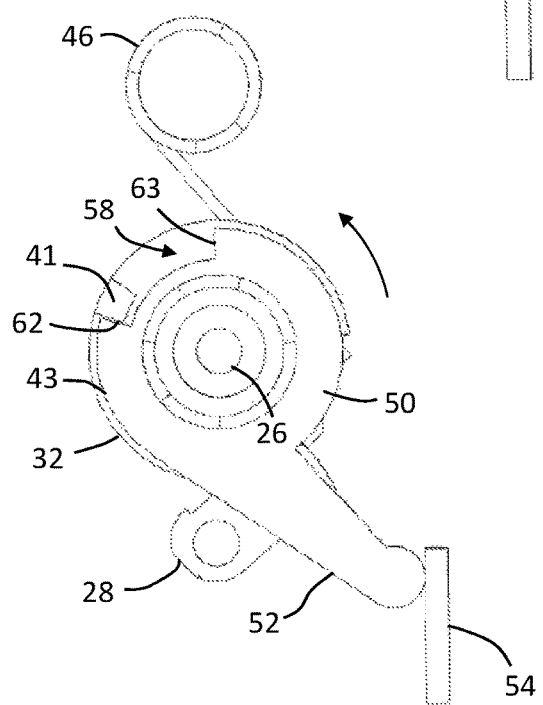
FIG. 9 is a second side view of the return mechanism of FIG. 7 with the release lever removed.

Referring now to FIGS. 7-9, the operation of the latch 20 is shown based on the user pulling the handle 22 for a second time within a predetermined period of time. When the handle 22 is pulled a second time, the release lever 24 once again rotates in the direction of arrow 60. As the release lever 24 rotates, the end of drive lever 28 engages the surface 38 of the second notch 36 rotating the position wheel 32. The rotation of the position wheel 30 causes the key member 41 to engage the side wall 62 of slot 58 and rotate the final lever 43. As the final lever 43 rotates, the arm 52 engages the pawl 54 moving the pawl 54 from an initial position to an unlatched position. The movement of the pawl 54 in turn releases the fork bolt 56 as is known in the art to unlatch the vehicle door.

It should be appreciated that when the latch 20 is in the activated state that it may be desirable to reset the position wheel 32 to the first position (with the drive lever 28 positioned in the first notch 34) if the user does not pull the handle 22 a second time within a predetermined period of time. This provides advantages in the latch not unlocking the vehicle door unexpectedly in response to a single handle pull. Referring now to FIGS. 10-12 with continuing reference to FIGS. 4-6, the operation of the latch 20 is shown resetting based on the user not pulling the handle 22 a second time within a predetermined period of time.

When the position wheel 32 is moved to the second position (FIGS. 4-6), the biasing member 46 applies a force to the cam surface 44. The arrow 64 (FIG. 5) indicates the vector of the force applied by the biasing member 46. It should be appreciated that vector 64 is offset from the axis 66 (FIG. 5). As a result, a torque is applied on the position wheel 32 in the direction indicated by arrow 68 (FIG. 5). This torque 68 biases the position wheel 32 to rotate in a manner that moves the surface 38 of the second notch 36 away from the drive lever 28 (e.g. in the direction indicated by arrow 68).

As the position wheel 32 continues to rotate, the drive lever 26 will slide onto the outer diameter of the position wheel (FIG. 10). In this position, the force vector 64 is still offset from the axis 66 to generate the torque 68. As a result, the position wheel 32 will continue rotate. The cam surface 44 may be shaped to provide a constant torque on the position wheel 32, or may be shaped to increase the torque as the position wheel 32 rotates.

In one non-limiting embodiment, once the contact point between biasing member 46 and the cam surface 44 transitions from the cam surface 44 to a side 70 (FIG. 11), the distance between the axis 66 and the force vector 64 may increase. As a result, the torque 68 may increase proportionately causing the position wheel 32 to rapidly rotate back to the first position (FIG. 12) with the drive lever 28 positioned into the first notch 34. Contact between the key 41 and the side wall 63 (FIG. 3) prevents further rotation of the position wheel 32.

It should be appreciated that by changing one or more of the cam surface 44 and the biasing member 46, the time period before the latch 20 resets to the first position may be changed.

Embodiments of the present invention provide advantages in resetting a double-pull type latch to a home or first position once the door handle has been pulled once and a second The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A latch for a vehicle door, comprising:
a final lever coupled to rotate about a pivot;
a position wheel rotationally coupled to the pivot, the position wheel having a first notch and a second notch, the position wheel being rotatable in a first direction;
a release lever coupled to the position wheel to rotate about the pivot, the release lever being configured to be coupled with a door handle of the vehicle door;
a cam member coupled to the position wheel, the cam member having a cam surface;
a drive lever arranged to engage the first notch and the second notch, the drive lever being pivotally coupled to the release lever; and
a biasing member arranged to apply a force on the cam surface to move the position wheel in the first direction when the drive lever is moved into the second notch, wherein the release lever is configured to move the position wheel from the first position to the second position based on the door handle being pulled a first time and wherein the position wheel is configured to rotate the final lever to a released position based on the door handle being pulled a second time after being pulled the first time.

2. The return mechanism of claim 1, wherein the biasing member and the cam member cooperate to rotate the position wheel to engage the drive lever in the first notch when the door handle is not pulled for the second time within a predetermined period of time after the door handle being pulled the first time.

3. The return mechanism of claim 2, wherein the biasing member is a torsion spring.

4. The return mechanism of claim 3, wherein the final lever includes an arm configured to move a pawl when the door handle is pulled the second time within the predetermined period of time.

5. A method of resetting a double pull vehicle latch, comprising:

rotating a position wheel in a first direction from a first position to a second position based upon a door handle being pulled a first time, the door handle being operably coupled to a release lever operably coupled to the position wheel;
engaging a drive lever in a first notch of the position wheel when the position wheel is in the second position;
rotating the position wheel from the second position to the first position when the door handle is not pulled a second time within a predetermined period of time;
moving the drive lever into a second notch of the position wheel when the position wheel is in the second position; and
rotating a final lever with the position wheel by moving the position wheel into to a third position from the second position when the door handle is pulled a second time within the predetermined period of time.

6. The method of claim 5, wherein the rotating of the position wheel from the second position to the first position includes applying a force on a cam surface with a biasing member.

7. The method of claim 5 further comprising: engaging a pawl with an arm of the final lever based on the position wheel moving to the third position.

8. A double-pull door latch system, comprising:
a door handle;
a latch operably coupled to the door handle via the release lever rotating about a pivot;
a position wheel operably coupled to the release lever to rotate about the pivot, the position wheel having a first notch and a second notch, the release lever and position wheel cooperating to rotate the position wheel in a first direction from a first position to a second position based on the door handle being pulled a first time, the release lever and the position wheel further cooperating to rotate the position wheel from the second position to a released position based on the door handle being pulled a second time within a predetermined time period after the door handle is pulled the first time;
a drive lever rotationally coupled to the release lever, the drive lever engaging the first notch when the position wheel is in the first position and wherein the drive lever engages the second notch when the position wheel is in the second position;
a cam member coupled to the position wheel; and
a biasing member, the biasing member cooperating with the cam member to rotate the position wheel from the second position to the first position based on the door handle not being pulled a second time within the predetermined time period after the door handle is pulled the first time.

9. The double-pull door latch system of claim 8 further comprising:
a final lever selectively coupled to rotate about the pivot, the final lever rotating with the position wheel as the position wheel rotates from the second position to the released position when door handle has been pulled the second time after the first time within the predetermined time period.

10. The double-pull door latch system of claim 9 further comprising:
a pawl movable from an initial position to an unlatched position;
wherein the final lever engages the pawl to move the pawl from the initial position to the unlatched position when the door handle is pulled the second time after the first time within the predetermined time period.

11. The double-pull door latch system of claim 9, wherein the drive lever is biased into the first notch in the first position.

12. The double-pull door latch system of claim 11, wherein the drive lever is biased into the second notch in the second position.

13. The double-pull door latch system of claim 12, wherein the drive lever engages the second notch when the position wheel rotates to the released position.

14. The double-pull door latch system of claim 13, wherein the drive lever engages an outer diameter of the position wheel when the position wheel is rotated from the second position to the first position.

* * * * *